United States Patent [19]
Bogut et al.

[11] 3,877,001
[45] Apr. 8, 1975

[54] BATTERY STATUS INDICATOR

[75] Inventors: Henry A. Bogut, Coral Springs; Jerome C. Leonard, Plantation, both of Fla.

[73] Assignee: Motorola, Inc., Chicago, Ill.

[22] Filed: Jan. 14, 1974

[21] Appl. No.: 432,919

[52] U.S. Cl. .............. 340/249; 325/185; 325/492
[51] Int. Cl. .................................. G08b 21/00
[58] Field of Search .......... 340/249; 325/185, 186, 325/492

[56] References Cited
UNITED STATES PATENTS
3,594,751   7/1971   Ogden ......................... 340/249 X

*Primary Examiner*—John W. Caldwell
*Assistant Examiner*—Daniel Myer
*Attorney, Agent, or Firm*—Eugene A. Parsons; Vincent J. Rauner

[57] ABSTRACT

A semiconductor switch connecting the battery to a light emitting diode, operative for a predetermined period of time in response to the operation of a transceiver power switch if the battery is above a predetermined value and operative in response to the operation of a transmit switch in a constant "on" mode if the battery voltage is above the predetermined value and in a periodic mode if the battery voltage is low.

5 Claims, 2 Drawing Figures

3,877,001

BATTERY STATUS INDICATOR

BACKGROUND OF THE INVENTION

1. FIELD OF THE INVENTION

In many types of battery operated electronic equipment, especially transceivers and the like, it is desirable to have some indication of the status of the battery. Further, it is not only desirable to know whether the battery is charged or discharged but it is also desirable to know when the battery voltage is low. Thus, when the battery is low the operator can replace the battery with a completely charged battery and recharge the low battery without subassembly interrupting the operation of the equipment.

2. DESCRIPTION OF THE PRIOR ART

In the prior art, devices are provided which indicate continuously the condition of a battery by means of, for example, lights flashing at a rate depending upon the charge of the battery. These circuits are objectionable because they drain substantial quantities of current from the battery. Further, the operator soon becomes used to the flashing light and a gradual change in the rate of flash may not be immediately perceived. Thus, the battery voltage might drop far below the desired rate before the operator notices that the light is flashing at a different rate.

SUMMARY OF THE INVENTION

The present invention pertains to a battery status indicator including a switching means coupling the battery to an indicating device upon actuation of the switching means, said switching means being actuated for a predetermined period of time by the operation of the power switch in the electronic circuitry containing the status indicator if the battery voltage is above a predetermined value and upon actuation of an operating switch (e.g., a transmit switch) said switching means being actuated by periodic means and comparing means continuously if the battery voltage is above the predetermined value and periodically when the battery voltage drops below the predetermined value. Thus, the indicating device operates briefly whenever the electronic circuitry is first turned on, to indicate that everything is operating correctly and that the battery voltage is above a predetermined value, continuously when the electronic circuitry is operated and the battery voltage is above the predetermined value and periodically whenever the electronic circuitry is operated and the battery voltage is low.

It is an object of the present invention to provide an improved battery status indicator.

It is a further object of the present invention to provide an improved battery status indicator which provides a brief indication each time circuitry attached to the battery is initially turned on if the battery voltage is above a predetermined value, a continuous indication when the attached circuitry is operated and the battery voltage is above the predetermined value and a periodic indication each time circuitry attached to the battery is operated and the battery has a low charge.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
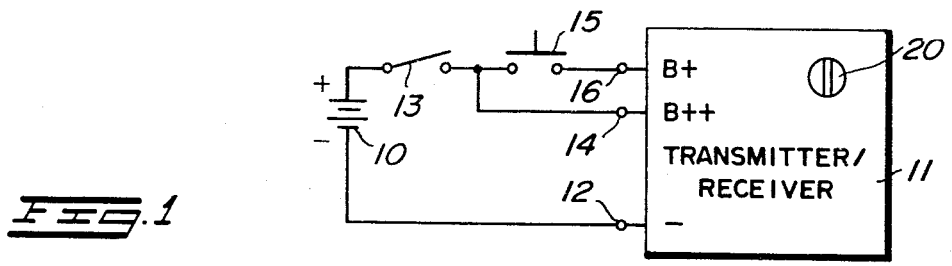
FIG. 1 is a semi-schematic block diagram of a transceiver incorporating an embodiment of the present invention.

Referring to FIG. 1, a battery 10 is provided for supplying power to some desired circuitry, such as a transmitter/receiver 11. The negative side of the battery 10 is connected to the ground or common terminal 12 of the transmitter/receiver 11. The positive side of the battery 10 is connected through an on-off power switch 13 to a B++ terminal 14 and through a push-to-talk switch 15 to a B+ terminal 16 of the transmitter/receiver 11. The battery 10 powers the transmitter/receiver 11 and it is desired to provide an indicator to supply an indication of the status of the battery 10 when the transmitter/receiver 11 is in operation. While it should be understood that the on-off switch 13 and push-to-talk switch 15 generally form a portion of the transmitter/receiver 11 and the battery 10 generally plugs into the transmitter/receiver 11, the switches and battery are illustrated separate from the transmitter/receiver 11 in FIG. 1 to more clearly define how power from the battery 10 is supplied to the terminals 14 and 16. A circuit for the transmitter/receiver 11 is not illustrated since it does not form a portion of this invention.

The transmitter/receiver 11 includes a battery status indicator constructed in accordance with the present invention. An indicating device, which in this embodiment is a light emitting diode 20 is positioned in the housing of the transmitter/receiver 11 so as to be clearly visible to one operating the transmitter/receiver 11. It should of course be understood that other indicating devices might be utilized but the light emitting diode is one of the most reliable devices and has the longest life.

Figure 2:
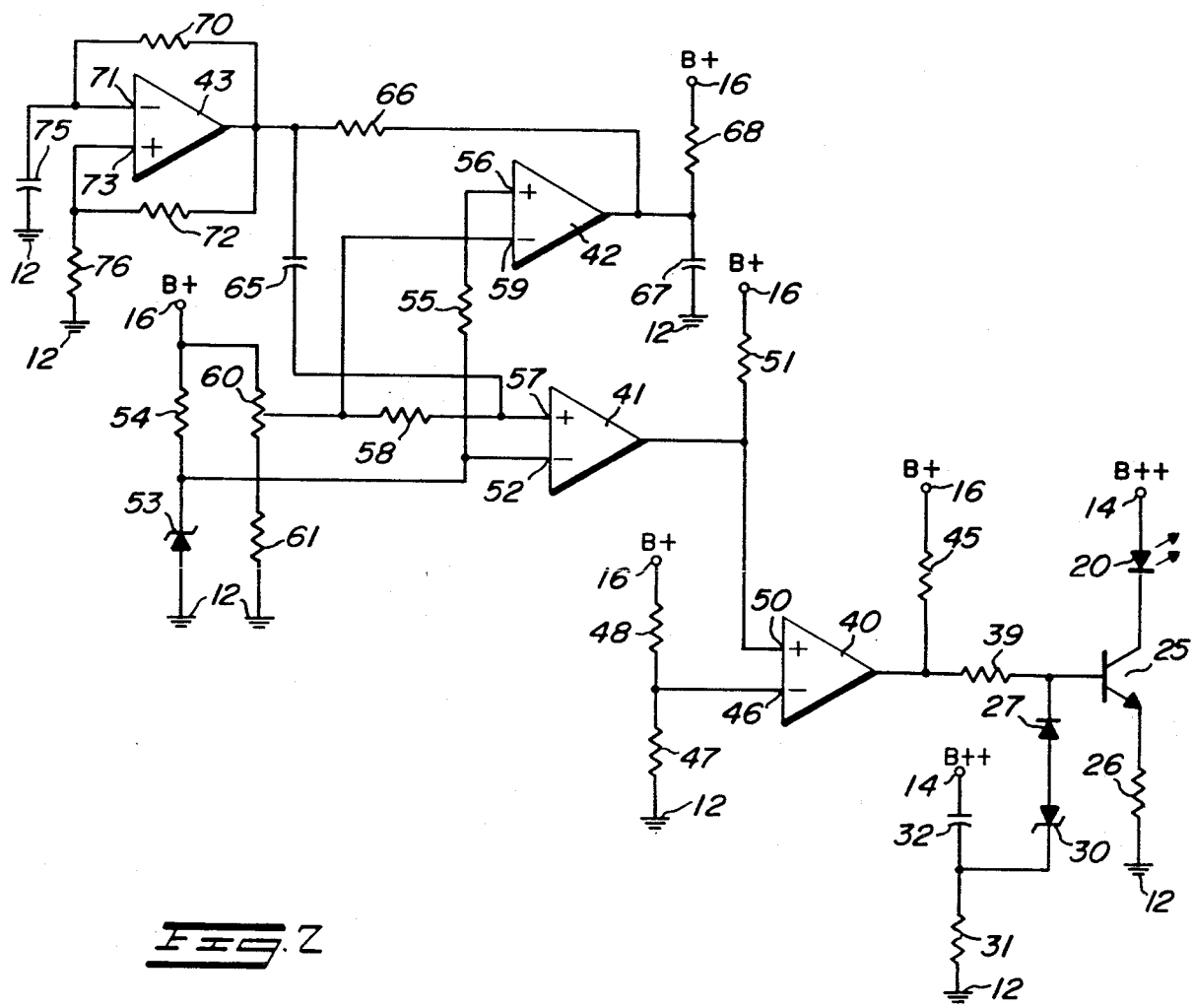
FIG. 2 is a schematic diagram of an embodiment of the present invention.

FIG. 2 illustrates a schematic diagram of the battery status indicator included in the transmitter/receiver 11 of FIG. 1. The anode of light emitting diode 20 is connected directly to the B++ terminal 14 and the cathode is connected to the collector of a transistor 25. The emitter of transistor 25 is connected through a resistor 26 to the common or ground terminal 12. The base of the transistor 25 is connected to the cathode of a diode 27, the anode of which is connected to the anode of a zener diode 30. The cathode of the zener diode 30 is connected through a resistor 31 to the common terminal 12 and through a capacitor 32 to the B++ terminal 14.

The transistor 25 and the associated circuitry set forth above form a switching means and a timing means for supplying a suitable voltage to activate the light emitting diode 20 for a short period of time upon closure of the on-off switch 13. Upon initial closure of the on-off switch 13 the voltage of battery 10 is applied to terminal 14 across capacitor 32 and resistor 31. Initially the capacitor 32 looks like a short and all of the voltage is applied across the resistor 31. This voltage is applied through the zener diode 30 and diode 27 to the base of transistor 25, causing conduction therein if the voltage is above a predetermined value. Conduction of transistor 25 completes the circuit for the light emitting diode 20 and supplies nearly full battery power (except for current limiting resistor 26) thereacross. Therefore, light emitting diode 20 provides an indication that the battery 10 and the circuitry is operating. As capacitor 32 charges to the voltage of battery 10, the voltage across resistor 31 drops and, eventually, insufficient power is supplied to the base of transistor 25 to maintain conduction therein. Thus, the light emitting diode 20 remains on only long enough to indicate to the operator that the battery and circuitry are operating.

The base of transistor 25 is connected through a resistor 39 to the output of a comparator circuit 40. Comparator circuit 40 and three other comparator circuits 41, 42 and 43 are included on a single integrated circuit chip, but it should be understood that they might be individual integrated circuit chips, hybrid, circuits, or discrete circuits if desired. The output of comparator circuit 40 is also connected through a resistor 45 to the B+ terminal 16. A negative input 46 of the comparator circuit 40 is connected through a resistor 47 to the common terminal 12 and through a resistor 48 to the B+ terminal 16. A positive input 50 to the comparator circuit 40 is connected through a resistor 51 to the B+ terminal 16 and to the output of comparator circuit 41. A negative input 52 of the comparator circuit 41 is connected through a zener diode 53 to the common terminal 12 and through a resistor 54 to the B+ terminal 16. The negative input 52 is also connected through a resistor 55 to a positive input 56 of the comparator circuit 42. A positive input 57 of the comparator circuit 41 is connected through a resistor 58 to a negative input 59 of the comparator circuit 42. The negative terminal 59 of the comparator 42 is also connected to the variable arm of a potentiometer 60, one side of which is connected to the B+ terminal 16 and the other side of which is connected through a resistor 61 to the common terminal 12. The positive input 57 of the comparator 41 is also connected through a capacitor 65 to the output of the comparator circuit 43. The output of the comparator circuit 43 is connected through a resistor 66 to the output of the comparator circuit 42, which is also connected through a capacitor 67 to the common terminal 12 and through a resistor 68 to the B+ terminal 16. The output of the comparator circuit 43 is also connected through a resistor 70 to a negative input thereof 71 and through a resistor 72 to a positive input thereof 73. The negative input 71 of the comparator circuit 43 is connected through a capacitor 75 to the ground terminal 12. The positive terminal 73 of the comparator circuit 43 is connected through a resistor 76 to the common terminal 12.

The four comparator circuits 40, 41, 42 and 43 and their associated circuitry supply a constant actuating signal to the base of transistor 25 whenever switch 15 is operated and the voltage of battery 10 (voltage at the B+ terminal 16) is within a predetermined voltage range and a periodic actuating signal whenever the battery voltage is below the predetermined voltage range. The operation of the circuitry is as follows. Zener diode 53 provides a predetermined or reference voltage at the negative or low input 52 of comparator circuit 41 and the positive or high input 56 of the comparator circuit 42. Resistor 61 and potentiometer 60 form a voltage divider circuit with the output voltage being variable and adjusted so that it is greater than the predetermined voltage provided by the zener diode 53 when the battery voltage at terminal 16 is within a desired range but less than the predetermined voltage provided by the zener diode 53 when the battery voltage at terminal 16 drops below the desired range.

When the voltage of battery 10 is within the desired operating range the voltage at the movable arm of potentiometer 60, which is supplied to the positive of high terminal 57 of comparator circuit 41 and to the negative or low terminal 59 of comparator circuit 42, is above the reference voltage provided by the zener diode 53. Thus, comparator circuit 42 has a higher voltage on terminal 59 than it does on terminal 56 and the voltage at the output thereof is low. Also, comparator circuit 41 has a higher voltage at the terminal 57 than it does at the terminal 52 and the output voltage thereof is high. Resistors 47 and 48 are approximately equal (e.g., 47 k) so that the high voltage supplied by the output of the comparator circuit 41 to the input terminal 50 of comparator circuit 40 is above the voltage supplied to the input terminal 46. Thus, the output voltage of comparator circuit 40 is high and the switching transistor 25 is in a conducting state, whereby the light emitting diode 20 is energized.

When the voltage of the battery 10 drops below a predetermined value, or out of the desired operating range, the voltage at the variable arm of potentiometer 60 drops below the reference voltage provided by the zener diode 53. Under this condition the voltage at the terminal 52 of comparator circuit 41 is above the voltage at the terminal 57 so that the output voltage of comparator circuit 41 is low. With a low voltage supplied to the input terminal 50 of comparator circuit 40, the input terminal 46 is high (relative to terminal 50) and the output is low so that the switching transistor 25 is nonconducting.

The low voltage at the variable arm of potentiometer 60, relative to the reference voltage provided by the zener diode 53, causes the comparator circuit 42 to have a high voltage at the output thereof, which is applied through resistor 66 and capacitor 65 to the input 57 of comparator circuit 41. This high voltage causes comparator circuit 41 to produce a high voltage at the output thereof with the consequent turning on of switching transistor 25. The high voltage at the output of comparator circuit 42 is also applied through resistor 66 and resistors 70 and 72 to the inputs 71 and 73 of the comparator circuit 43. The capacitor 75 connected between the input 71 and the common terminal 12 causes the input terminal 71 to initially appear substantially grounded. Resistor 76 is relatively large compared to resistor 72 and causes substantially all of the output voltage from the comparator circuit 42 to be applied to the input 73 of the comparator circuit 43. Thus, comparator circuit 43 initially has a high voltage applied to the positive or high terminal 73 and a low voltage applied to the negative or low terminal 71, which causes the output thereof to be high. Since the output voltage of the comparator circuit 43 is high, it has no effect on the high output voltage from the comparator circuit 42 which is being applied to the input terminal 57 of comparator circuit 41. However, as capacitor 75 charges the voltage applied to the input terminal 71 of comparator circuit 43 gradually increases until the circuit switches and the output voltage is low. When the circuit switches the comparator circuit 43 drops the voltage at the output thereof to substantially zero so that the output voltage of the comparator circuit 42 is no longer applied to the input 57 of comparator circuit 41 and, simultaneously, capacitors 65 and 75 are discharged. (It should be noted that comparator circuit 43 provides a low resistance conduction path to ground from the output thereof when the output is low.) Thus, whenever the voltage supplied by battery 10 is low the comparator circuits 42 and 43 and their associated circuitry provide periodic means which periodically operate the transistor 25 and cause the light emitting diode 20 to flash.

Thus, an improved battery status indicator is disclosed which provides a brief indication when circuitry (e.g., transceivers and the like) is initially turned on if the battery voltage is above a predetermined value. This brief indication tells the operator that the battery voltage is satisfactory and the status indicating circuitry is operating. When the attached circuitry, such as the transceiver, is operated the battery status indicator provides a continuous indication if the battery voltage is within a desired range and provides a flashing or periodic indication if the battery voltage is low (below the desired range). This, of course, provides the operator with indications at each step throughout the operation of the condition of his equipment. While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. Battery status indicator means comprising:
   a. an indicating device providing an indication when a suitable voltage is supplied thereto;
   b. switching means coupled to said indicating device and to a battery and operating to couple said indicating device to the battery during the application of an actuating signal to said switching means;
   c. timing means coupled to said switching means for supplying an actuating signal of a predetermined duration to said switching means upon connection of the battery to said timing means when the battery voltage is at least a predetermined value;
   d. comparing means coupled to said switching means and the battery for comparing the battery voltage to a predetermined value and applying an actuating signal to said switching means when the battery voltage is at least the predetermined value; and
   e. periodic means coupled to said comparing means and the battery for providing a periodic actuating signal through said comparing means to said switching means when the battery voltage is below the predetermined value.

2. Battery status indicator means as claimed in claim 1 including in addition an on-off switch connecting the battery to the switching means and to the timing means.

3. Battery status indicator means as claimed in claim 1 wherein the indicating device includes a light emitting diode.

4. Battery status indicator means as claimed in claim 2 including in addition a second switch connecting the comparing means and the periodic means to the on-off switch.

5. Battery status indicator means in a battery powered transmitter/receiver comprising:
   a. a light emitting diode providing light when a suitable voltage is supplied thereto;
   b. a battery;
   c. an on-off switch connecting said battery to designated terminals of the transmitter/receiver;
   d. a push-to-talk switch connecting other designated terminals of the transmitter/receiver to said on-off switch;
   e. switching means coupled to said light emitting diode and said on-off switch and operating to couple said diode to said on-off switch during the application of an actuating signal to said switching means;
   f. timing means coupled to said switching means and said on-off switch for supplying an actuating signal of a predetermined duration to said switching means upon connection of said battery through said on-off switch to said timing means when the battery voltage is a predetermined value;
   g. comparing means coupled to said switching means and said push-to-talk switch for comparing the voltage of said battery to a predetermined value and applying an actuating signal to said switching means when the voltage of said battery, connected through said push-to-talk and on-off switches, is at least the predetermined value; and
   h. periodic means coupled to said comparing means and said battery for providing a periodic actuating signal through said comparing means to said switching means when the battery voltage is below the predetermined value.

* * * * *